(12) United States Patent
Choi et al.

(10) Patent No.: US 7,800,602 B2
(45) Date of Patent: Sep. 21, 2010

(54) PHOTOSENSITIVE DISPLAY PANEL

(75) Inventors: Joon-Hoo Choi, Seoul (KR); In-Su Joo, Gyeonggi-do (KR); Hyung-Guel Kim, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 699 days.

(21) Appl. No.: 10/860,749

(22) Filed: Jun. 2, 2004

(65) Prior Publication Data

US 2005/0116937 A1      Jun. 2, 2005

(30) Foreign Application Priority Data

Dec. 1, 2003     (KR) ...................... 10-2003-0086184

(51) Int. Cl.
*G06F 3/038* (2006.01)
(52) U.S. Cl. ...................................... 345/207; 345/173
(58) Field of Classification Search ................. 345/175, 345/92, 104, 173, 207, 12; 349/12
See application file for complete search history.

(56) References Cited

U.S. PATENT DOCUMENTS 5,541,753 A      7/1996   Raynes et al.
5,812,109 A *    9/1998   Kaifu et al. ................. 345/104
6,947,102 B2 *   9/2005   den Boer et al. ............. 349/12
2005/0116937 A1* 6/2005   Choi et al. .................. 345/173

FOREIGN PATENT DOCUMENTS

CN      1114426      1/1996
JP      10-068816    3/1998

* cited by examiner

*Primary Examiner*—Amr Awad
*Assistant Examiner*—Yong Sim
(74) *Attorney, Agent, or Firm*—Innovation Counsel LLP

(57) ABSTRACT

A light-sensitive (i.e., touch-sensitive) display device that requires less circuitry than the currently available light-sensitive display devices is presented. Unlike the currently available devices, which require at least two switching elements and a capacitor to implement a photosensitive switch, the invention only requires one switching element. The device of the invention includes a substrate with a plurality of scan lines, a plurality of read-out lines, a power line, and an array of photosensitive switches formed thereon. The scan lines and the read-out lines extend in directions that are substantially perpendicular to each other, forming pixels. One photosensitive switch is formed in each pixel, and each photosensitive switch has one light-sensitive transistor. The transistor connects the power line to one of the read-out lines in response to sensing incident light.

31 Claims, 6 Drawing Sheets

PHOTOSENSITIVE DISPLAY PANEL

RELATED APPLICATION(S)

This patent application claims priority, under 35 U.S.C. §119, from Korean Patent Application No. 2003-86184 filed on Dec. 1, 2003, the content of which is incorporated by reference herein in its entirety.

BACKGROUND OF THE INVENTION

1. Field of the Invention

The invention relates generally to a light sensing panel and particularly to a light sensing liquid crystal display panel.

2. Discussion of the Related Art

Touch screens have become popular in various display applications such as PDAs and other computer products. Some touch screens are used with active matrix liquid crystal display (LCD) apparatuses. Most of the touch-enabled LCD apparatuses are based on resistive, capacitive, or inductive touch technology, which requires extra components that are typically not integrated into the LCD apparatuses, such as a touch panel. The need for extra components is disadvantageous, as it adds to the cost and size of the apparatus. Further, in some cases, the extra component (e.g., a touch panel) reduces the display transmittance, adversely affecting optical performance. Thus, effort has been geared to designing a display panel with an integrated light sensing element.

A photosensitive switch for a display panel currently requires at least two switching elements and a capacitor. An example of the integrated optical touch screens is disclosed in an article by den Boer et al. titled "Active Matrix LCD with Integrated Optical Touch Screen," SID 03 Digest (2003). An integrated optical touch screen usually includes a light sensing element that responds to the presence or absence of light to determine the location of the touch. The light sensing elements are arranged in a matrix that is designed for determining the location of the touch.

FIG. 1 is a circuit diagram showing a conventional light sensing element in an integrated touch screen display panel. The light sensing element is disposed in a pixel region of the LCD panel. A "pixel region" is defined as a rectangular area between two consecutive data lines (e.g., $D_P$ and $D_{P+1}$) and two consecutive gate lines (e.g., $G_Q$ and $G_{Q+1}$).

As shown in FIG. 1, the LCD panel includes a plurality of gate lines (GL), a plurality of data lines (DL), a first power supply line (VL1), a second power supply line (VL2), and two switching units. The first of the two switching units includes a switching element (Q1) that is electrically connected to the gate line $G_Q$ and the data line $D_P$, and a liquid crystal capacitor ($C_{LC}$) and a first storage capacitor ($C_{ST1}$) electrically connected to the switching element (Q1). The second switching unit includes a light-sensitive switching element (T1) that is coupled to the bias voltage ($V_{DD}$) through a first power line (VL1) and a read-out switching element (T2) that connects the light-sensitive switching element (T1) to a read-out line (ROL). The gate electrode of the light-sensitive switching element (T1) is coupled to a second power line (VL2), and the gate electrode of the read-out switching element (T2) is coupled to the neighboring gate line ($G_{Q+1}$). A second storage capacitor ($C_{ST2}$) electrically couples the gate of the light-sensitive switching element (T1) to a node between the light-sensitive switching element (T1) and the read-out switching element (T2).

The light-sensitive switching element (T1) responds to the presence/absence of external light by generating a charge corresponding to the sensed amount of light. The second storage capacitor ($C_{ST2}$) stores the charge from the light-sensitive switching element (T1). The read-out switching element (T2) outputs the charge that is stored in the second storage capacitor ($C_{ST2}$) to the read-out line (ROL). The light-sensitive switching element (T1), the second storage capacitor ($C_{ST2}$), and the read-out switching element (T2) form what is herein referred to as a photosensitive switch. Currently, the photosensitive switch requires at least two switching elements and a capacitor.

When light is incident on the light-sensitive switching element (T1), a negative voltage and a positive voltage are applied to a second power line (VL2) and a first power line (VL1), respectively, thereby turning off the light-sensitive switching element (T1). The second power line (VL2) and the first power line (VL1) are electrically connected to a gate electrode and a drain electrode of the light-sensitive switching element (T1), respectively. A current $I_{T1}$ that forms as a result of the light-sensitive switching element (T1) responding to incident light is greater than a current $I_{T2}$ formed by the read-out switching element (T2).

The current $I_{T1}$ charges the second storage capacitor ($C_{ST2}$) while the read-out switching element (T2) is turned off. The charge remains stored in the second storage capacitor ($C_{ST2}$) until the read-out switching element (T2) is turned on, at which point the charge flows to form the current $I_{T2}$ to the read-out line (ROL).

As stated above, a neighboring gate line ($G_{Q+1}$) is electrically connected to the gate electrode of the read-out switching element (T2). When a high voltage gate signal is applied to the neighboring gate line ($G_{Q+1}$), the charge stored in the second storage capacitor ($C_{ST2}$) is output to a read-out circuit (not shown) through the read-out switching element (T2) and the read-out line (ROL). Thus, when light is incident on the light-sensitive element (T1) and a high voltage is applied to the gate line $G_{Q+1}$, there is a signal on the read-out line (ROL). The light-sensitive element (T1) may be formed on an array substrate (i.e., substrate with signal lines formed thereon) of the LCD panel.

A pixel region of the array substrate has enough space to accommodate the light sensing element shown in FIG. 1. However, when a transmissive LCD apparatus or a transflective LCD apparatus includes the light sensing element, the presence of the extra circuitry results in a decreased pixel aperture.

One of the disadvantages of the integrated touch screen display panel shown in FIG. 1 is that the light sensing element contains two switching elements (e.g., thin film transistors) and one capacitor. This complicated structure of the light sensing element results in a complex array substrate circuitry, which makes the array substrate production difficult and decreases the yield. Furthermore, the highly complex circuitry makes it more likely that signal interference will form between elements in the pixel region.

An integrated optical touch screen that does not increase the cost or size of the display panel and does not decrease the performance of the display panel is desired.

SUMMARY OF THE INVENTION

The present invention is directed to a light sensing display panel, a light-sensitive device including the light sensing display panel, and a method of driving the light sensing display panel. The invention allows a light-sensitive (i.e., a touch-sensitive) display device to be made with less circuitry than in the currently available light-sensitive display devices.

With simplified circuitry, the display device of the invention is more cost efficient and brighter than the currently available devices.

In one aspect, the invention is a light-sensitive display device that includes a substrate and a scan line, a read-out line, and a photosensitive switch that are formed on the substrate. The scan line and the read-out line extend in directions that are substantially perpendicular to each other. The photosensitive switch has a first end, a second end, and no more than one switching element between the first end and the second end. The first end is electrically coupled to the scan line and the second end is electrically coupled to the read-out line. A bias voltage ($V_{DD}$) is applied to the first end of the switching element. When incident light turns "on" the switching element, a current flows from the first end to the second end of the photosensitive switch in response to incident light.

In another aspect, the invention is a light-sensitive display panel that includes a substrate with a plurality of scan lines, a plurality of read-out lines, a power line, and an array of photosensitive switches formed thereon. The scan lines and the read-out lines extend in directions that are substantially perpendicular to each other. A bias voltage is applied to the power line. Each of the photosensitive switches includes no more than one transistor. The transistor connects the power line to one of the read-out lines in response to sensing incident light.

In yet another aspect, the invention is a method of making a light-sensitive display device by providing a substrate with scan lines and read-out lines formed thereon to define pixel regions and forming a photosensitive switch in each of the pixel regions. The photosensitive switch includes no more than one transistor, and the transistor has a first end, a second end, and a gate electrode. The first end of the transistor is electrically coupled to one of the scan lines and the second end of the transistor is electrically coupled to one of the read-out lines so that the single transistor electrically connects the first end and the second end in response to light that is incident on the photosensitive switch.

BRIEF DESCRIPTION OF THE DRAWINGS

The accompanying drawings are included to aid the understanding of the invention and constitute a part of this specification for explaining the invention.

In the drawings.

DETAILED DESCRIPTION OF THE ILLUSTRATED EMBODIMENTS

Embodiments of the invention are described herein in the context of a liquid crystal display (LCD) apparatus. However, it is to be understood that the embodiments provided herein are just preferred embodiments, and the scope of the invention is not limited to the applications or the embodiments disclosed herein.

As used herein, "light" or "incident light" refers to radiation from a source outside of the display apparatus that is incident on a photosensitive switch and having an intensity above or below a preselected threshold level. A "photosensitive switch" applies a signal to a read-out line in response to incident light. Two components that are "directly electrically connected" do not have intervening components between the two components. In contrast, two components that are "electrically connected" or "electrically coupled" may be directly connected (i.e., without intervening components) or connected through one or more intervening components.

Figure 1:
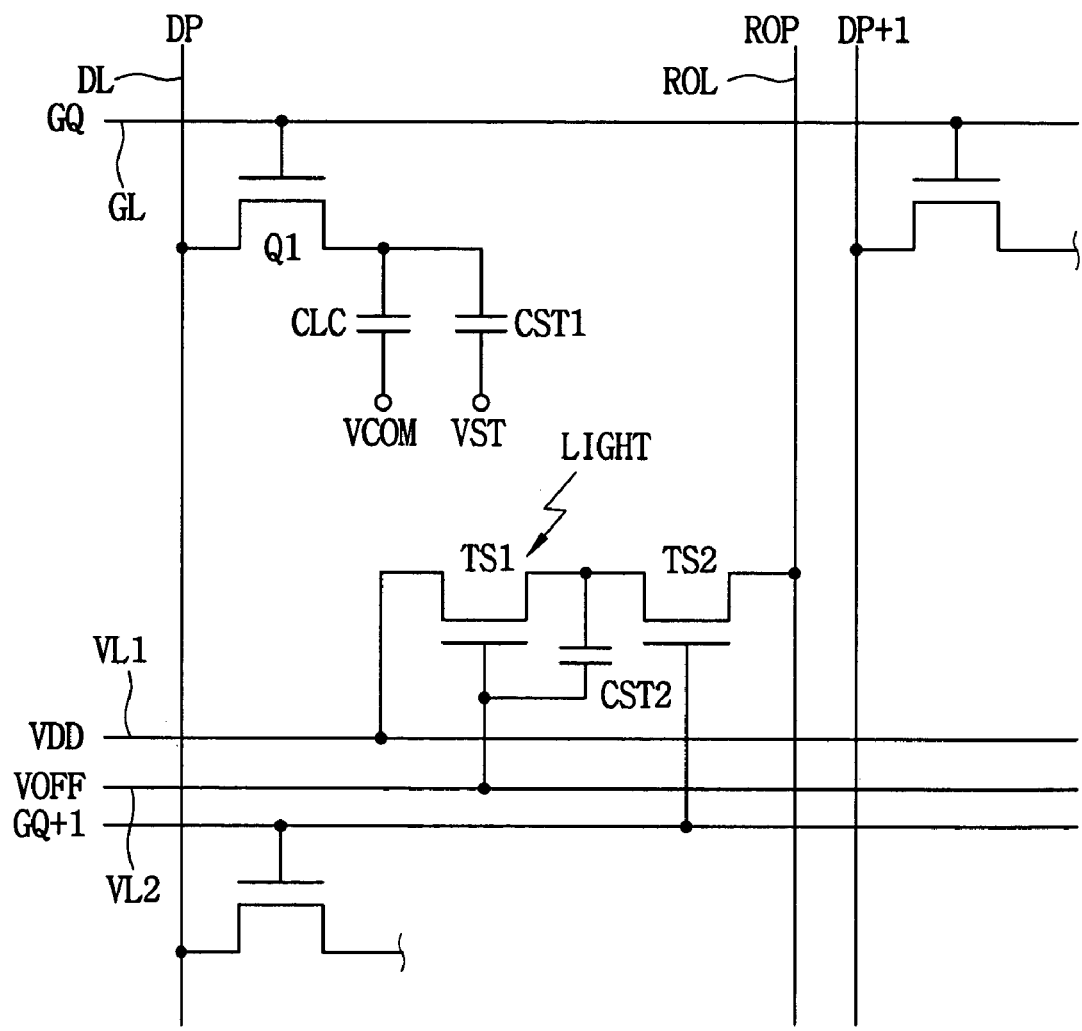
FIG. 1 is a circuit diagram showing a conventional light sensing element of an LCD panel.
Figure 2:
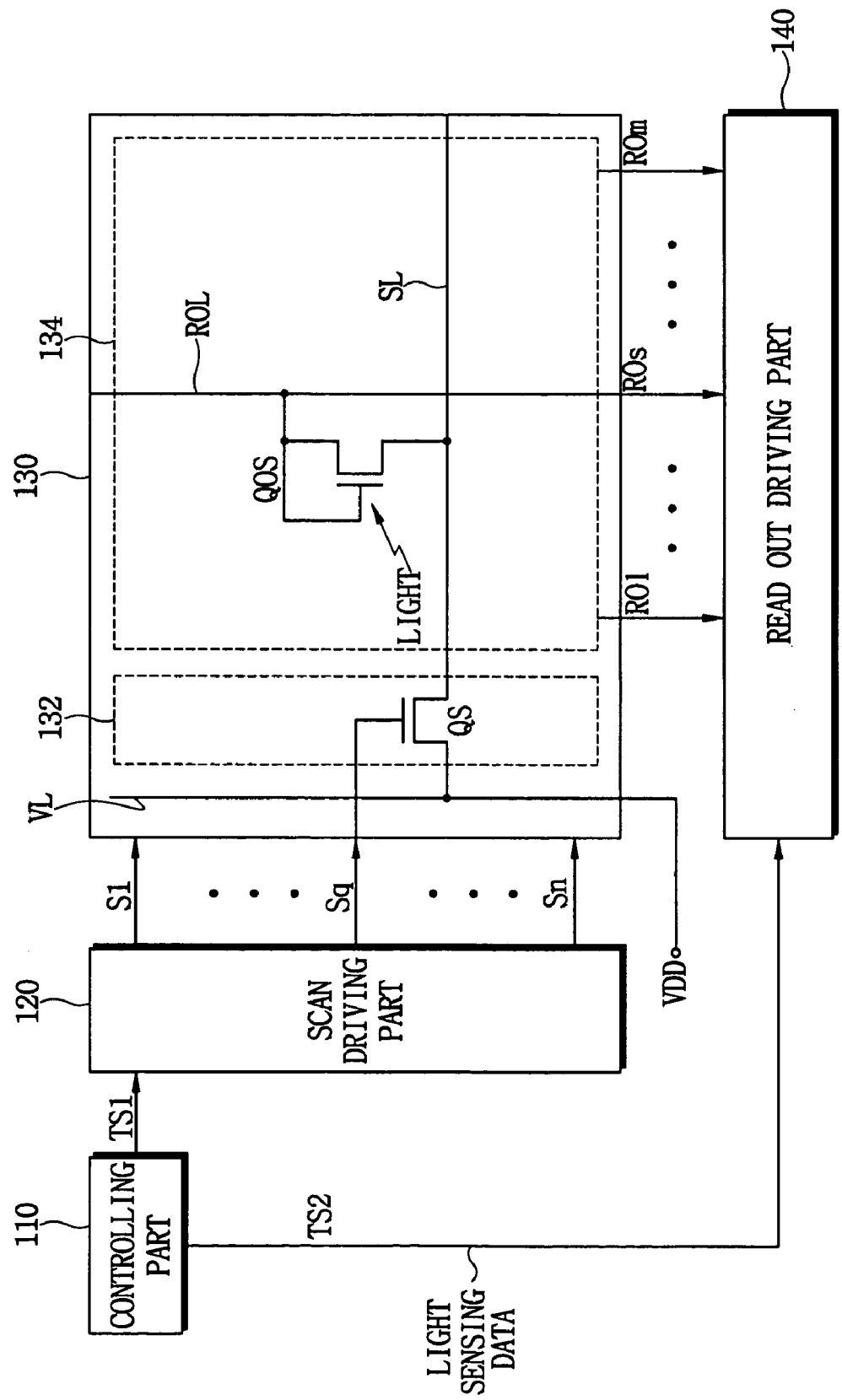
FIG. 2 is a plan view showing a light-sensitive apparatus according to an exemplary embodiment of the present invention.

FIG. 2 is a plan view of a light-sensitive apparatus according to an exemplary embodiment of the invention. The light-sensitive apparatus of FIG. 2 includes a controlling part 110, a scan driving part 120, a light sensing panel 130 and a read out driving part 140.

The controlling part 110 generates a first timing signal (TS1) to control the scan driving part 120 and a second timing signal (TS2) to control the read out driving part 140. The scan driving part 120 consecutively outputs scan signals (S1, . . . , Sq, . . . , Sn) to the light sensing panel 130 in response to the first timing signal (TS1). Preferably, the scan signals (S1, . . . , Sq, . . . , Sn) are received sequentially, not simultaneously.

The light sensing panel 130 extends in a first direction on a transparent substrate and includes a power line (VL) for transmitting a bias voltage ($V_{DD}$), a peripheral switch region 132 for controlling the output of the bias voltage ($V_{DD}$), and a light-sensitive region 134 for sensing the light in response to the controlled bias voltage ($V_{DD}$).

The light-sensitive region 134 includes a plurality of scan lines (SL), a plurality of read-out lines (ROL), and a photosensitive switch (QOS) for each pixel region formed by the scan lines and the read-out lines. The scan lines (SL) extend in the first direction and are arranged substantially parallel to one another. The read-out lines (ROL), on the other hand, extend in a second direction that is substantially perpendicular to the first direction, and are arranged substantially parallel to one another. As shown, the photosensitive switch (QOS) is formed in a pixel region defined by the scan lines (SL) and the read-out lines (ROL).

Each of the scan lines (SL) is connected to one of the peripheral switches (QS) in the peripheral switch region 132. Each of the peripheral switches (QS) receives the bias voltage ($V_{DD}$). As the scan driving part sends the signals $S_1$ through $S_n$ sequentially, the switches (QS) get turned on sequentially. When a switch (QS) is turned on, the bias voltage ($V_{DD}$) is transmitted to the corresponding scan line (SL).

The photosensitive switch (QOS) includes a drain electrode connected to the scan line (SL), a gate electrode, and a source electrode electrically connected to the read-out line (ROL). The photosensitive switch (QOS) is turned on in response to the bias voltage ($V_{DD}$) and outputs a light detection signal to the read-out line (ROL) upon sensing incident light. A voltage applied to the drain electrode is higher than the voltage applied to the source electrode (depending on the embodiment, the voltage applied to the drain electrode may be lower than the voltage applied to the source electrode). The photosensitive switch (QOS) includes an amorphous silicon TFT. Although the TFT may be the top gate type, it is preferably the lower gate type.

The read out driving part 140 forms light detection data in response to the light detection signal received from the read-out line (ROL), by using data conversion according to the second timing signals (TS2) from the controlling part 110. The read out driving part 140 applies the light sensing data to the controlling part 110.

Figure 3:
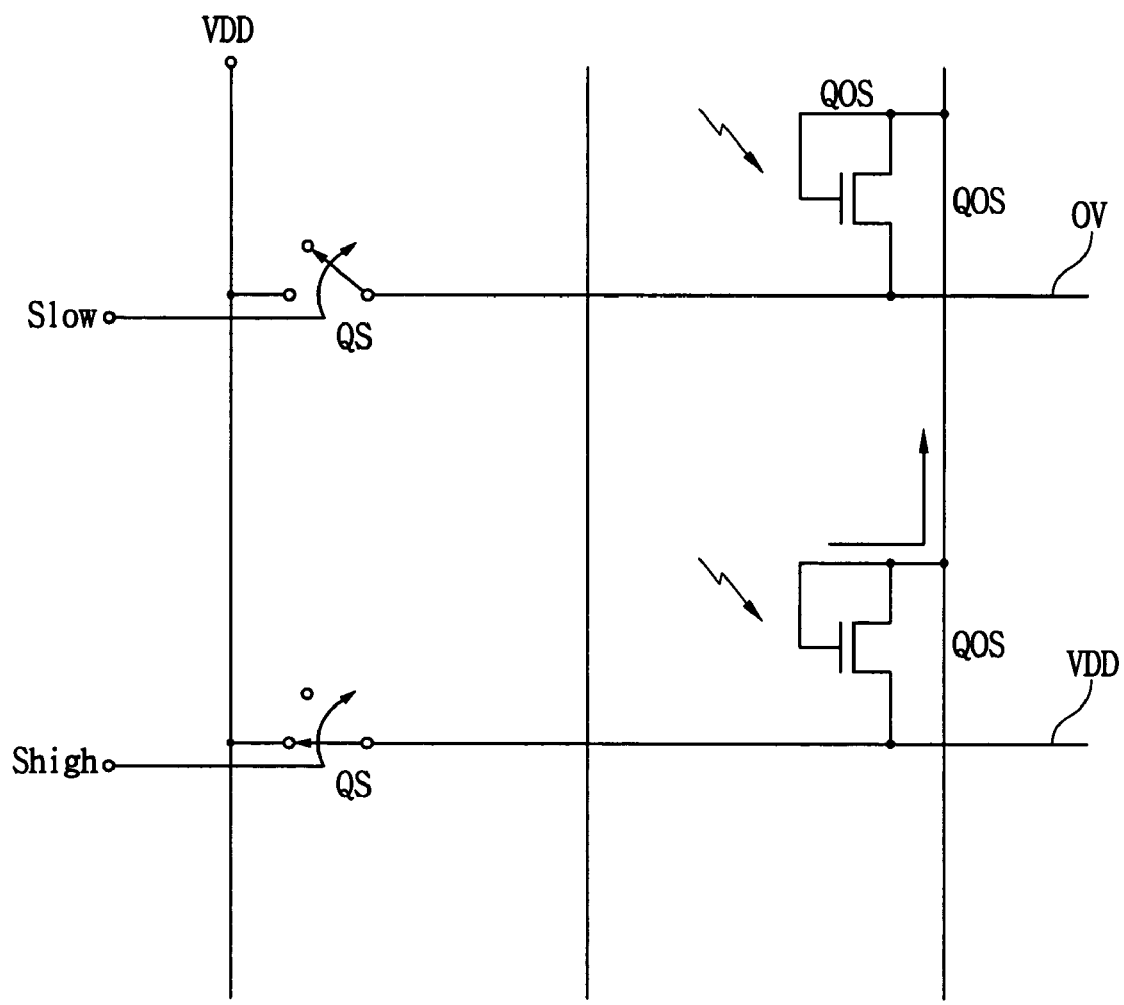
FIG. 3 is a circuit diagram showing an operation of a light sensing element according to an exemplary embodiment of the present invention.

FIG. 3 is a circuit diagram showing an operation of a photosensitive switch (QOS) according to an exemplary embodiment of the present invention. When a low level scan signal ($S_{low}$) is applied to the scan line (SL), a peripheral switch (QS) of the peripheral switch region 132 is turned off and the scan line (SL) is floated. When the scan line (SL) is floated, no signal is received by the read-out line (ROL) even if light is incident on the photosensitive switch (QOS). When the low level scan signal ($S_{low}$) is applied to the scan line (SL), a gate-source voltage (Vgs) and a drain-source voltage (Vds) are both at zero. Thus, no current is formed regardless of whether light that is incident on the photosensitive switch (QOS).

On the other hand, when a high level scan signal ($S_{high}$) is applied to the scan line (SL), the corresponding peripheral switch (QS) in the peripheral switch region 132 is turned on so that the bias voltage ($V_{DD}$) is applied to the scan line (SL). Current flows to the read-out line (ROL) in response to the bias voltage ($V_{DD}$). Incident light turns on the photosensitive switch (QOS). A potential difference corresponding to the magnitude of the current is formed on the read-out line (ROL). When the high level scan signal ($S_{high}$) is applied to the scan line (SL), the gate-source voltage (Vgs) is zero volt and the drain-source voltage (Vds) is equal to the bias voltage ($V_{DD}$). Thus, a current is formed in response to incident light, turning on the photosensitive switch (QOS).

Although the scan signals are sequentially applied to the scan lines, current flows to the read-out line (ROL) only if light is sensed by the photosensitive switch (QOS) connected to a particular scan line. Based on which read-out line receives a signal, the location where light is incident can be determined.

Figure 4:
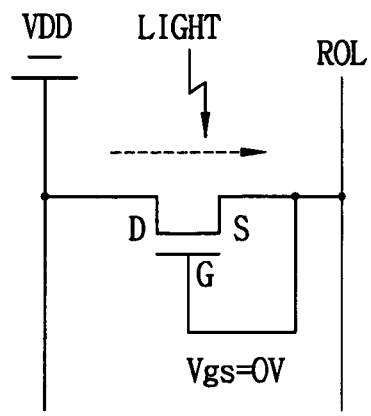
FIG. 4 is a circuit diagram showing an operation of a light sensing part according to an exemplary embodiment of the present invention.
Figure 5:
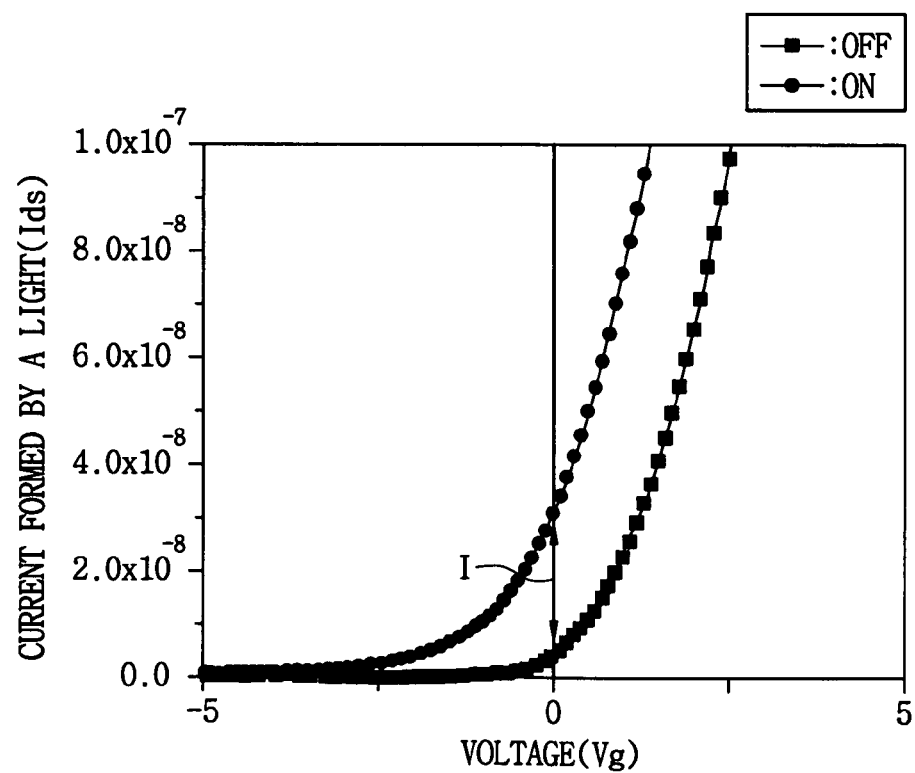
FIG. 5 is a graph showing an operation of a light sensing part according to an exemplary embodiment of the present invention.

FIG. 4 is a circuit diagram showing an operation of a photosensitive switch (QOS) according to an exemplary embodiment of the present invention, and FIG. 5 is a graph showing an operation of a photosensitive switch (QOS) according to an exemplary embodiment of the present invention. In FIG. 5, the current that flows when light is incident on the photosensitive switch (QOS) is represented by a symbol '♦'. The current that flows without incident light is represented by a symbol '■'. As shown, the current through the photosensitive switch (QOS) increases when there is incident light, even when the same gate voltage is applied.

As shown in FIGS. 4 and 5, the gate electrode (G) of the light sensitive switch (QOS) is electrically connected to the source electrode (S) of the light sensitive switch (QOS) so that the gate-source voltage (Vgs) of the light sensing TFT (QOS) is about 0V.

The bias voltage ($V_{DD}$) is selected according to the intensity of the light that strikes the light sensitive switch (QOS), to avoid saturating the read-out line (ROL). Preferably, the bias voltage ($V_{DD}$) is provided by a direct power source and ranges from about 2V to about 10V.

When light is incident on the light sensitive switch (QOS), the light-induced current (I) flows through the light sensitive switch (QOS). The light detection signal is generated in response to the light-induced current (I) flowing the read-out line (ROL) and reaching the read out driving part 140.

Figure 6A:
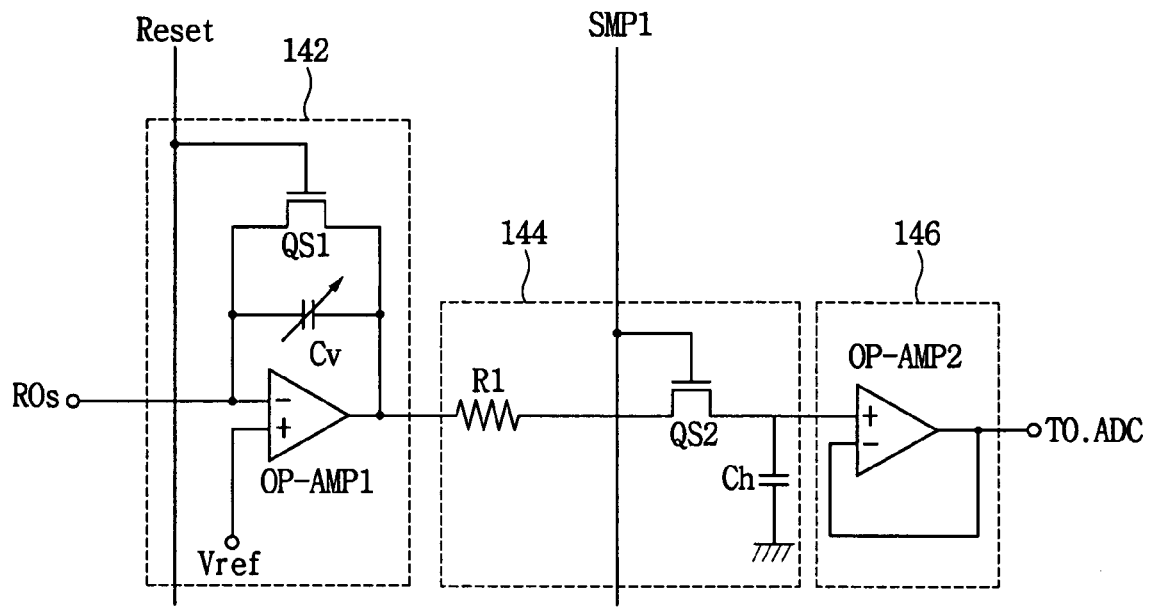
FIG. 6A is a circuit diagram showing a read out driving part according to an exemplary embodiment of the present invention.

FIG. 6A is a circuit diagram showing the read-out driving part 140 according to an exemplary embodiment of the present invention. The read out driving part 140 includes a plurality of units for sensing the light detection signal that flows in through the read-out line (ROL). Each of the units includes an integral part 142, a sample/holding part 144, and a buffer 146.

The integral part 142 includes a first switching element (QS1), a first operational amplifier (OP-AMP1) and a variable condenser ($C_v$) that is electrically connected to both the inverting input and the output of the first operational amplifier (OP-AMP1). The first operational amplifier (OP-AMP1) and the variable condenser ($C_v$) perform an integration process. The first switching element (QS1) controls the integration process. The first switching element (QS1) is electrically connected to both ends of the variable capacitor ($C_v$) and discharges the variable capacitor ($C_v$) when the first switching element (QS1) is closed. The discharge determines the start of the integration process. The first switching element (QS1) discharges the variable capacitor ($C_v$) at a slower rate than the end portions of the variable capacitor ($C_v$) being shorted so as to maintain the lifetime of the variable capacitor and the first switching element (QS1) as long as possible.

The sample/holding part 144 includes a resistor (R1), a second switching element (QS2) and a hold capacitor ($C_h$). A first end portion of the resistor (R1) is electrically connected to the output of the integral part 142. A gate electrode of the second switching element (QS2) is electrically connected to a sample signal line through which a sample signal (SMP1) is applied, and a drain electrode of the second switching element (QS2) is electrically connected to a second end portion of the resistor (R1). A first end of the hold capacitor ($C_h$) is grounded, and a second end of the hold capacitor ($C_h$) is electrically connected to a source electrode of the second switching element (QS2).

The second switching element (QS2) and the hold capacitor ($C_h$) form a sample/hold circuit. The sample/hold circuit holds the sample signal (SMP1) until a next sample signal is applied, to maintain a sampling value during analog-digital converting process. The second switching element (QS2) performs the sampling process, and the hold capacitor ($C_h$) performs the sample holding process.

The buffer 146 includes a second operational amplifier (OP-AMP2) that acts as a voltage follower. A first input of the second operational amplifier (OP-AMP2) is electrically connected to the second end of the hold capacitor ($C_h$), and an output of the second operational amplifier (OP-AMP2) is electrically connected to an analog-digital converter (ADC, not shown). The second operational amplifier (OP-AMP2) includes a positive input and a negative input. The positive input of the second operational amplifier (OP-AMP2) is electrically connected to the second end of the hold capacitor ($C_h$). The output of the second operational amplifier (OP-AMP2) is electrically connected to the analog-digital converter (ADC) and loops back to the negative input to perform the feedback process.

The voltage follower controls the impedance and direction of a signal that passes through the voltage follower. When a light detection signal is sensed as being weak, the light detection signal may be changed in response to the impedance of the read out driving part. For example, when the input impedance of the read out driving part is small, the voltage of the sensing signal may be changed by the current from the read-out line. When the output impedance of the read-out line is 100 kΩ and the input impedance of the read out driving part is 100 kΩ, the voltage of the light detection signal is reduced by half.

The voltage follower increases the input impedance of the read out driving part so that the input impedance of the read out driving part is greatly larger than the output impedance of the read-out line, thereby improving sensing accuracy.

The input impedance of the voltage follower is substantially equal to the input impedance of the operational amplifier. The input impedance of the voltage follower may be 1MΩ, and the output impedance of the voltage follower may be 100Ω to change a weak signal to a strong signal, to output a strong signal. The output impedance of the voltage follower is substantially equal to the output impedance of the operational amplifier.

The signal passes through the voltage follower in a predetermined direction regardless of the read out driving part.

Figure 6B:
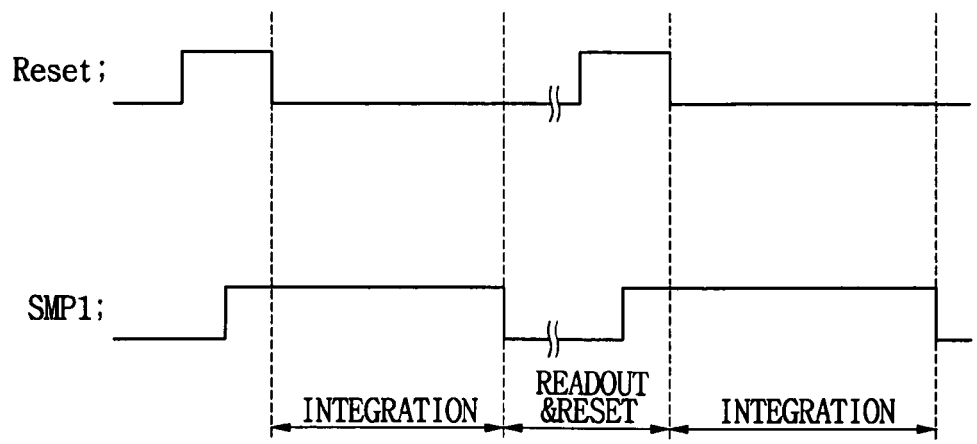
FIG. 6B is a timing diagram showing a signal applied to a read out driving part according to an exemplary embodiment of the present invention.

FIG. 6B is a timing diagram showing a signal applied to a read out driving part according to an exemplary embodiment of the present invention. As shown, a reset signal is changed from a low level to a high level at a certain point in time. The sample signal is then changed from a low level to a high level. The integration process starts when the reset signal is changed from high level to low level, and the integration process terminates when the sample signal (SMP1) is changed from high level to low level.

The read out process and the reset process start when the sample signal (SMP1) is changed from high level to low level and end when the reset signal is changed from high level to low level.

Figure 7:
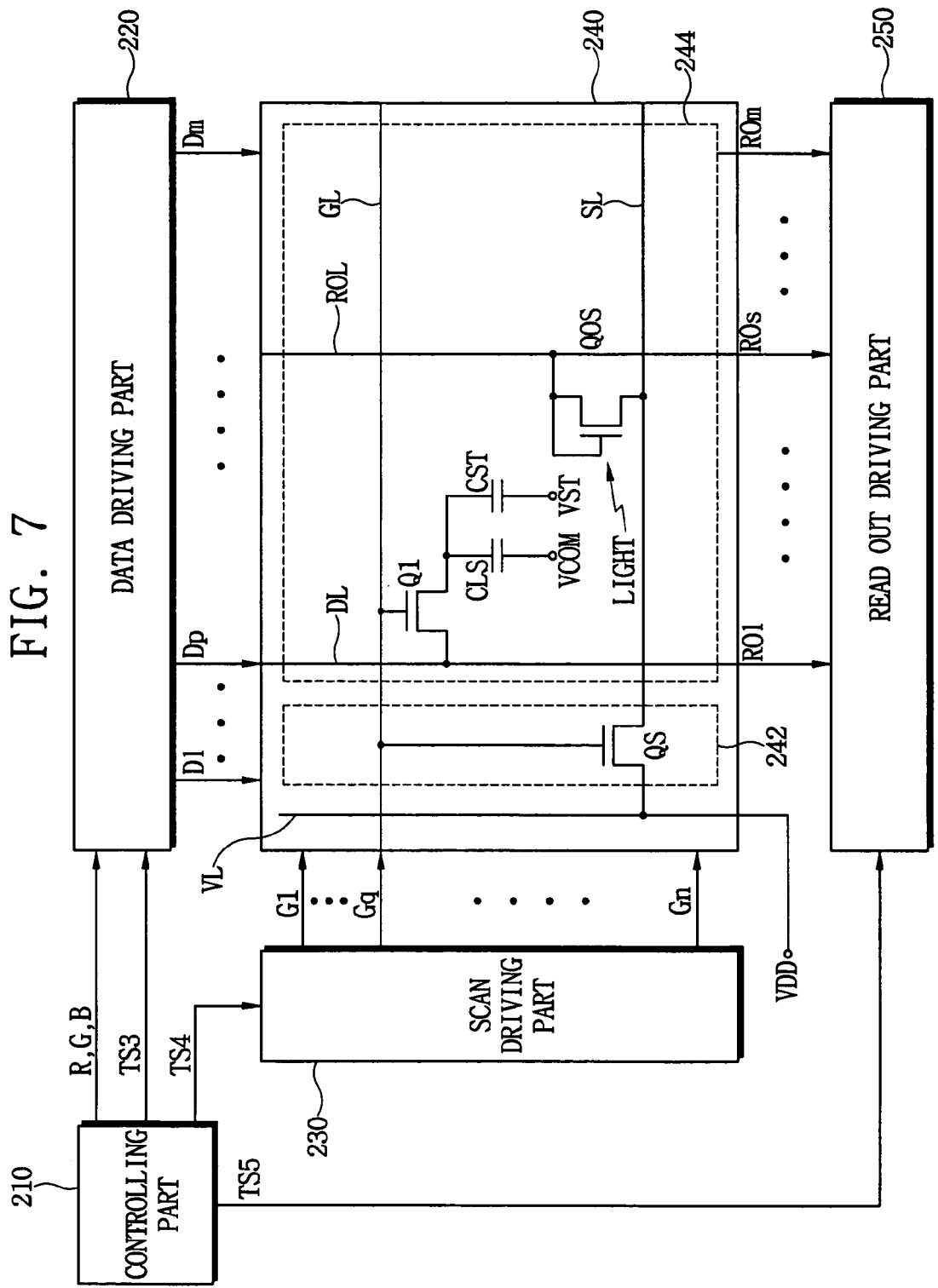
FIG. 7 is a plan view showing a light-sensitive apparatus according to another exemplary embodiment.

FIG. 7 is a plan view showing a light-sensitive apparatus according to another exemplary embodiment. The light-sensitive apparatus of FIG. 7 includes a controlling part 210, a data driving part 220, a scan driving part 230, a light sensing panel 240, and a read out driving part 250.

The controlling part 210 outputs a pixel signal (R, G, B) and a third timing signal (TS3) to the data driving part 220, and outputs a fourth timing signal (TS4) to the scan driving part 230. The controlling part 210 also outputs a fifth timing signal (TS5) to the read out driving part 250.

The data driving part 220 outputs data signals (D1, . . . , Dp, . . . , Dm) to the light sensing panel 240 in response to the third timing signal (TS3).

The scan driving part 230 outputs scan signals (S1, . . . , Sq, . . . , Sn) for displaying the light sensing panel 240 in response to the fourth timing signal (TS4). Preferably, the scan signals (S1, . . . , Sq, . . . , Sn) are applied sequentially, not simultaneously.

The light sensing panel 240 includes a peripheral region and a display region 244. A bias voltage ($V_{DD}$) is applied to a power line (VL) that extends in a first direction on the light sensing panel 240. A switching part 242 that controls the output of the bias voltage ($V_{DD}$) is formed in the peripheral region.

A scan line (GL), a data line (DL), a switching element (Q1), a liquid crystal capacitor ($C_{LC}$) and a storage capacitor ($C_{ST}$) are formed in the display region 244. A plurality of display scan lines (GL) and a plurality of data lines (DL) extend across the display region 244. The switching element (Q1) is formed in each pixel region defined by the display scan lines (GL) and the data lines (DL). The liquid crystal capacitor ($C_{LC}$) is electrically connected to the switching element (Q1), and the storage capacitor ($C_{ST}$) is electrically connected to the switching element (Q1). A drain electrode of the switching element (Q1) and a common electrode applying a common electrode voltage ($V_{COM}$) form the liquid crystal capacitor ($C_{LC}$). The drain electrode of the switching element (Q1) and a storage line applying a storage voltage ($V_{ST}$) form the storage capacitor ($C_{ST}$).

A light-sensing scan line (SL), a read-out line (ROL), and a photosensitive switch (QOS) are also formed in the display region 244. A plurality of the light-sensing scan lines (SL) and a plurality of the read-out lines (ROL) may be formed in the display region 244. The light-sensing scan line (SL) is disposed in parallel with the display scan line (GL). The read-out line (ROL) is disposed in parallel with the data line (DL) and in a direction substantially perpendicular to the directions in which the scan lines (SL, GL) extend. The photosensitive switch (QOS) is formed in a region defined by the scan lines (SL) and the read-out lines (ROL) so as to sense light in response to the bias voltage ($V_{DD}$) controlled by the peripheral switch (QS). The photosensitive switch (QOS) includes an amorphous silicon TFT. The drain electrode of the amorphous silicon TFT is electrically connected to the light-sensing scan line (SL), and a gate electrode of the amorphous silicon TFT is electrically connected to a source electrode of the amorphous silicon TFT and the read-out line (ROL).

The read out driving part 250 forms light detection data using data conversion, in response to a light detection signal transmitted from the read-out line (ROL) of the light sensing panel 240. The light detection data is subsequently fed to an analog-digital converter (not shown).

In an alternative embodiment, the scan driving part 230 is formed on the light sensing panel 240.

According to aspects of the present invention, the gate electrode of the amorphous silicon TFT is electrically connected to the source or drain electrode of the amorphous silicon TFT. This connection allows the intensity of light to be sensed with one TFT. Therefore, the number of the TFT in the pixel region is reduced, allowing for a greater opening ratio per pixel. The greater opening ratio enhances the luminance of the LCD apparatus. The fact that a common gate scan voltage is applied to the gate scan line also contributes to improved luminance because it obviates the need to form a gate scan line for each of the amorphous silicon TFT, thus increasing the opening ratio.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A light-sensitive display device comprising:
   a substrate having a light-sensitive region and a peripheral switch region;
   a scan line formed on the substrate;
   a read-out line formed on the substrate, the read-out line extending in a direction substantially perpendicular to the direction in which the scan line extends;
   a photosensitive switch located in the light-sensitive region and having a first end, a second end, and a control end, wherein the first end is electrically coupled to the scan line, the second end is directly electrically coupled to the read-out line, and the control end is directly electrically connected to the second end such that the photosensitive switch applies a light sensing signal to the read-out line in response to incident light when a bias voltage ($V_{DD}$) is applied to the first end; and
   a peripheral switch electrically connected to the scan line in the peripheral switch region.

2. The device of claim 1, wherein the switching element is a light-sensitive transistor comprising a gate electrode between the first end and the second end, wherein the gate electrode electrically connects the first end and the second end in response to incident light.

3. The device of claim 1, wherein the switching element is an amorphous thin film transistor having a gate electrode.

4. The device of claim 1 further comprising:
a power line charged with the a bias voltage ($V_{DD}$) that is applied to the first end; and
a switch connected to the power line, wherein the switch has a switch state that varies with time and wherein the switch connects or disconnects the power line and the scan line according to the switch state.

5. The device of claim 1 further comprising:
a gate line extending substantially parallel to the scan line;
a data line extending substantially parallel to the read-out line; and
a switching unit having a third end, a fourth end, a fifth end, and a sixth end, wherein the third end is coupled to the gate line, the fourth end is coupled to the data line, the fifth end is coupled to a common voltage source ($V_{COM}$), and the sixth end is coupled to stationary voltage source ($V_{ST}$).

6. The device of claim 1, wherein the first end of the photosensitive switch is directly electrically coupled to the scan line.

7. The device of claim 4 further comprising:
a scan driving part that generates a scan signal for changing the switch state; and
a read-out driving part that receives the light sensing signal and converts the light sensing signal to data of a predetermined format.

8. The device of claim 7, wherein the read-out driving part comprises:
an integral part for integrating light sensing signals from the read-out line;
a holding circuit for holding the sample signal until a next sample signal is received; and
a voltage follower for controlling an impedance and direction of the sample signal.

9. The device of claim 8, wherein the integral part comprises:
a first operational amplifier having a first inverting input, a first noninverting input, and a first output;
a variable capacitor that is electrically coupled to the first inverting input and the first output; and
a first read-out driver switching element that is electrically coupled to the first inverting input and the first output, wherein the first read-out driver switching element triggers the integration process by turning on and discharging the variable capacitor.

10. The device of claim 8, wherein the holding circuit comprises:
a resistor connected to the integral part;
a second read-out driver switching element coupled to the resistor; and
a hold capacitor coupled to the second switching element, wherein the second switching element electrically connects the resistor and the hold capacitor in response to a sample signal.

11. The device of claim 8, wherein the voltage follower comprises a second operational amplifier having a second noninverting input and a second inverting input, such that the second switching element and the hold capacitor are connected to the second noninverting input.

12. The device of claim 8, wherein the read-out driving part receives a reset signal and wherein the sample signal changes from a first signal to a second signal in response to a change in the reset signal from a third signal to a fourth signal, thereby triggering integration.

13. The device of claim 12, wherein the integration process terminates when the sample signal is changed from the second signal to the first signal.

14. The device of claim 13, wherein the read-out process begins in response to the sample signal changing from the second signal to the first signal and terminates in response to a change in the reset signal from the fourth signal to the third signal.

15. The device of claim 5 further comprising:
a liquid crystal capacitor coupled to the fifth end and the common voltage source ($V_{COM}$); and
a storage capacitor coupled to the sixth end and the stationary voltage source ($V_{ST}$).

16. The device of claim 5 further comprising a power line carrying a bias voltage ($V_{DD}$) and a switch connecting the power line to the scan line in response to a signal being applied to the gate line.

17. The device of claim 16 further comprising a scan driving part that generates the signal that is applied to the gate line.

18. The device of claim 16 further comprising a read-out driver part that receives the light sensing signal and converts the light sensing signal to data of a predetermined format.

19. A light-sensitive display panel comprising:
a substrate having a light-sensitive region and a peripheral switch region;
a plurality of scan lines formed on the substrate and extending in a first direction;
a plurality of read-out lines formed on the substrate and extending in a second direction that is substantially perpendicular to the first direction;
a power line formed on the substrate, wherein a bias voltage is applied to the power line;
an array of photosensitive switches formed on the substrate, wherein each of the photosensitive switches is in the light-sensitive region and includes a first end, a second end, and a control end wherein the control end is directly electrically connected to the second end that is directly electrically coupled to one of the read-out lines, each of the photosensitive switches connecting one of the scan lines to the one of the read-out lines in response to sensing incident light; and
a peripheral switch electrically connected to each of the scan lines in the peripheral switch region.

20. The device of claim 19 further comprising an array of switches formed on the substrate, wherein each of the switches is associated with a switch state that is changeable with time, and wherein the power line connects to and disconnects from one of the scan lines according to the switch state of one of the switches that corresponds to the one of the scan lines.

21. The device of claim 19, wherein the transistor has a gate electrode that is electrically connected to the one of the read-out lines.

22. The device of claim 19 further comprising:
gate lines extending substantially parallel to the scan lines;
data lines extending substantially parallel to the read-out lines; and
switching units connected to the gate lines and the data lines, wherein each of the switching units has a first end, a second end, a third end, and a fourth end, wherein the first end is coupled to one of the gate lines, the fourth end is coupled to one of the data lines, the third end is coupled to a common voltage source ($V_{COM}$), and the fourth end is coupled to a stationary voltage source ($V_{ST}$).

23. The device of claim 20 further comprising:
a scan driving part that sequentially sends scan signals to the array of switches, wherein the scan signals determine the switch state; and
a read-out driving part that receives one or more light sensing signals from the read-out lines and converts the light sensing signals to data of a predetermined format.

24. A method of making a light-sensitive display device, the method comprising:
providing a substrate with scan lines and read-out lines formed thereon to define pixel regions in a light-sensitive region, the substrate having a light-sensitive region and a peripheral switch region;
forming a photosensitive switch in each of the pixel regions of the light-sensitive region, wherein the photosensitive switch includes no more than one transistor, the transistor having a first end, a second end, and a gate electrode;
directly electrically coupling the first end to one of the scan lines, the second end to one of the read-out lines, and the gate electrode to the second end so that the single transistor electrically connects the first end and the second end in response to light that is incident on the photosensitive switch; and
forming a peripheral switch electrically connected to each of the scan lines in the peripheral switch region.

25. The method of claim 24 further comprising electrically connecting the second end to the gate electrode.

26. The method of claim 24 further comprising:
forming a power line that receives a bias voltage ($V_{DD}$); and
forming an array of switches wherein each of the switches has a third end and a fourth end, wherein the third end is connected to the power line and the fourth end is connected to one of the scan lines, such that the power line is connected or disconnected from the one of the scan lines according to a switch state.

27. The method of claim 24 further comprising:
forming a plurality of gate lines, wherein the gate lines are substantially parallel to the scan lines;
forming a plurality of data lines, wherein the data lines are substantially parallel to the read-out lines;
forming a switching unit having a third end, a fourth end, a fifth end, and a sixth end, wherein the third end is connected to the gate line, the fourth end is connected to one of the data lines, the fifth end is connected to a common voltage source ($V_{COM}$), and a sixth end is connected to a stationary voltage source ($V_{ST}$).

28. The method of claim 26 further comprising:
forming a scan driving part that sends signals to the switches, wherein the signals determine the switch state; and
a read-out driving part that receives a signal from one of the read-out lines and converts the light sensing signal to data of a predetermined format.

29. The method of claim 27 further comprising:
forming a first capacitor ($C_{LC}$) between the fifth end and the common voltage source; and
forming a second capacitor ($C_{ST}$) between the sixth end and the stationary voltage source.

30. The method of claim 27 further comprising:
forming an array of switches, wherein each of the switches has a seventh end connected to a power line, an eighth end connected to one of the scan lines, wherein each of the switches connects or disconnects the seventh end and the eighth end according to a signal from one of the gate lines.

31. A light-sensitive display device comprising:
a substrate having a light-sensitive region and a peripheral switch region;
a scan line formed on the substrate;
a read-out line formed on the substrate, the read-out line extending in a direction substantially perpendicular to the direction in which the scan line extends;
a photosensitive transistor located in the light-sensitive region and having a source, a drain, and a gate electrode between the source and the drain, wherein the drain and the source are directly electrically coupled to the scan line and the read-out line, respectively, such that a current flows between the drain and the source when light is incident on the photosensitive transistor and a bias voltage ($V_{DD}$) is applied to the first end, and wherein the source is directly electrically connected to the gate electrode; and
a peripheral switch electrically connected to the scan line in the peripheral switch region.

* * * * *